United States Patent [19]

Akashi et al.

[11] Patent Number: 4,594,908
[45] Date of Patent: Jun. 17, 1986

[54] TRANSMISSION WITH TWO PARALLEL DRIVING SHAFTS BEARING TWO DRIVING GEARS EACH MESHED WITH SAME DRIVEN GEAR ON PARALLEL DRIVEN SHAFT

[75] Inventors: Teruo Akashi; Hiroshi Ito; Shigemichi Yamada, all of Toyota, Japan

[73] Assignee: Toyota Jidosha Kabushiki Kaisha, Toyota, Japan

[21] Appl. No.: 470,382

[22] Filed: Feb. 28, 1983

[30] Foreign Application Priority Data

Jun. 18, 1982 [JP] Japan .................................. 57-104732

[51] Int. Cl.⁴ .............................................. F16H 3/10
[52] U.S. Cl. ....................................... 74/359; 74/331; 74/368
[58] Field of Search ................ 74/331, 330, 357, 358, 74/359, 356, 329, 368; 192/48.92, 48.6

[56] References Cited

U.S. PATENT DOCUMENTS

| | | | |
|---|---|---|---|
| 2,543,412 | 2/1951 | Kegresse | 74/331 X |
| 2,572,480 | 10/1951 | Hoffman | 74/359 |
| 2,633,753 | 4/1953 | Campodonico | 74/331 X |
| 2,792,714 | 5/1957 | Forster | 74/368 |
| 3,769,857 | 11/1973 | Whateley | 74/359 X |
| 4,023,418 | 5/1977 | Zenker | 74/331 X |
| 4,106,364 | 8/1978 | Zenker et al. | 74/331 X |

FOREIGN PATENT DOCUMENTS

| | | | |
|---|---|---|---|
| 1207451 | 2/1960 | France | 74/330 |
| 1222139 | 6/1960 | France | 74/730 |
| 55-63040 | 5/1980 | Japan | 74/329 |
| 56-164264 | 12/1981 | Japan | 74/359 |
| 2069635 | 8/1981 | United Kingdom | 74/331 |

Primary Examiner—Lawrence J. Staab
Assistant Examiner—Dwight G. Diehl
Attorney, Agent, or Firm—Oblon, Fisher, Spivak, McClelland & Maier

[57] ABSTRACT

A power supplying member supplies rotational power in a certain rotational direction to an input member of the transmission, and a power receiving member takes out power from a driven gear wheel shaft. Two driving gear wheel shafts extend parallel to the driven gear wheel shaft. First and second driving gear wheels are respectively rotatably mounted on the first and the second driving gear wheel shaft and meshed with a common driven gear wheel fixedly mounted on the driven gear wheel shaft. First and second synchromesh devices respectively selectively engage the first and the second driving gear wheel to the first and the second driving gear wheel shaft. First and second clutching mechanisms, each of which either can be disconnected so as to freewheel in both rotational directions or can be connected in the one rotational direction which is required for transmission of power through that clutching mechanism from the power supplying member rotating in the certain rotational direction so as to function as a one way clutch, are mounted to selectively transmit rotational power between the input member and the first and second driving gear wheel shafts respectively, both proximate to ends of the first and second driving gear wheel shafts closer to the input member.

6 Claims, 2 Drawing Figures

TRANSMISSION WITH TWO PARALLEL DRIVING SHAFTS BEARING TWO DRIVING GEARS EACH MESHED WITH SAME DRIVEN GEAR ON PARALLEL DRIVEN SHAFT

BACKGROUND OF THE INVENTION

1. Field of the Invention

The present invention relates to the field of transmission mechanisms for use in automatic gearboxes, and more particularly relates to such a transmission mechanism which provides various speed stages by use of two selectively engagable power transmission systems each of which is equipped with a clutching mechanism.

2. Description of the Prior Art

There is a known type of transmission mechanism for providing various speed stages between a first rotating member and a second rotating member, which comprises two power transmission systems, each of which can selectively be engaged to provide transmission of rotational power at its own particular speed ratio (or typically any selectable one of a plurality of ratios) between the first and second members, and each of which has a clutching mechanism which either can be connected so as to thus transmit rotational power or can be disconnected so as not thus to transmit rotational power. By appropriately controlling the engagement and disengagement of the clutching mechanisms, and concurrently controlling the selection of the various speed ratios of the various power transmission systems, which may be done automatically by a transmission control system of a per se well known type so as to provide entirely automatic operation, it is therefore possible to automatically shift between a plurality of speed stages even when the engine is under load and to provide both powered and engine braking operation of the transmission as a whole, and also to provide a starting off from rest functional capability, without the use of any fluid torque converter, which is a very valuable saving in the construction of an automatic transmission for vehicle use.

However, this prior art type of transmission mechanism has suffered from the disadvantage the such a mode of operation requires close and accurate control of the timing of the engagement and disengagement of the various clutching mechanisms. If the engagement of one of the clutching mechanisms occurs somewhat too late after the disengagement of the previously engaged transmission mechanism, then for a certain intermediate period the engine associated with the transmission will race, especially during a power on speed stage shift when the engine is under load as during upshifting of the transmission during acceleration or during a kick down type downshift, and this can damage various elements of the transmission mechanism; and on the other hand if the engagement of one of the clutching mechanisms occurs somewhat too early before the disengagement of the previously engaged transmission mechanism is complete, then for a short time period very large torsional strains are liable to be put on various elements of the transmission, in consequence of such an attempt, effectively, to engage two different speed ratios of the transmission at one time, and this also can damage various elements of the transmission mechanism. Such a thusly necessitated close and indeed subtle control of the timing of the engagement and disengagement of the various clutching mechanisms has presented a severe disadvantage with respect to the realization of an automatic transmission incorporating such a transmission mechanism, because such close timing control is very difficult to ensure, especially after the transmission has been used for a long period of time and its operational time constants have altered with usage. For example, in the case of a hydraulic type transmission control system, changes in the viscosity of the hydraulic fluid and changes in the size of the various orifices of the control system can cause timing variations of a magnitude sufficient to invalidate any attempt to perform such subtle control. Especially, good timing control is important in the case of power applied on downshifting of the transmission or a so called kick down downshift, when engine load is high, and snappy and accurate shifting of the speed stages of the transmission mechanism is particularly important and also difficult to provide in such a case.

Another factor that is required to be taken account of in the design of a transmission mechanism for an automatic transmission is mountability in a vehicle. The friction engaging elements of a transmission such as the hydraulic clutches thereof are liable to be quite large in diameter, especially as compared with the diameters of the various gear wheels of the transmission, and especially in the case of a front engine rear wheel drive type of vehicle such a transmission mechanism as outlined above has presented the constructional difficulty that the amount of space available for mounting such large diameter clutching mechanisms has not been very generous, since typically the rear end of an automatic transmission which utilizes such a transmission mechanism has been required to be housed at least partly under the floor of the passenger compartment of the vehicle, perhaps within a so called transmission tunnel or transmission hump thereof. On the other hand, in the case of a front engine, front wheel drive type vehicle such a transmission mechanism as outlined above has presented the constructional difficulty that the amount of axial space available for mounting the transmission has been very limited, which has limited the axial length of the transmission as a whole.

Finally, it is almost a required characteristic of such a transmission mechanism that it should provide engine braking for the vehicle, at least in some of the speed stages thereof. Smooth starting off from rest of the vehicle, both forwards and backwards, are also very important, and it should not be necessary for unduly delicate control of the clutching mechanisms to be exerted in order to obtain this effect. Power loss in the transmission should be minimized. Further, within these above mentioned constraints, it is a general design objective of such an automatic transmission mechanism to be as light and compact as possible, and to have as short an axial length as possible.

SUMMARY OF THE INVENTION

Accordingly, it is the primary object of the present invention to provide a transmission mechanism of the general sort described above, in which no particularly fine timing control of the clutching mechanisms is required in order to obtain proper shifting between speed stages.

It is a further object of the present invention to provide such a transmission mechanism, which has very good mountability in a vehicle.

It is a further object of the present invention to provide such a transmission mechanism, which particularly has very good mountability in a vehicle in the front engine rear wheel drive type configuration.

It is a further object of the present invention to provide such a transmission mechanism, which is well adapted to be mounted to a vehicle with its rearward portion underneath the front part of the floor of the passenger compartment thereof.

It is a further object of the present invention to provide such a transmission mechanism, which, when mounted to a vehicle with its rearward portion underneath the front part of the floor of the passenger compartment thereof, does not cause any unacceptably large transmission hump or tunnel in said floor.

It is a further object of the present invention to provide such a transmission mechanism, of which the height of the upper rear portion is minimized.

It is a further object of the present invention to provide such a transmission mechanism, which is generally short in its axial length.

It is a further object of the present invention to provide such a transmission mechanism, in which the radially large elements do not present a mounting obstacle, when the transmission is to be mounted in a vehicle.

It is a further object of the present invention to provide such a transmission mechanism, in which the radially large elements are kept towards the engine end of the transmission.

It is a further object of the present invention to provide such a transmission mechanism, in which engine braking is available in at least some of the speed stages.

It is a further object of the present invention to provide such a transmission mechanism, in which downshifting during high engine load conditions is carried out snappily and accurately.

It is a further object of the present invention to provide such a transmission mechanism, in which power loss is mimimized.

It is a further object of the present invention to provide such a transmission mechanism, in which the starting off operation from rest is made particularly smooth.

It is a further object of the present invention to provide such a transmission mechanism, in which an engine flywheel is also used as a member of one of the clutching mechanisms thereof.

It is a further object of the present invention to provide such a transmission mechanism as proximately described above, in which said clutching mechanism in which said engine flywheel is used is the one of the clutching mechanisms which is required to transmit the most torque.

It is a further object of the present invention to provide such a transmission mechanism as proximately described above, in which said clutching mechanism in which said engine flywheel is used is the one of the clutching mechanisms which is utilized during starting off of the vehicle from rest.

It is a further object of the present invention to provide such a transmission mechanism, in which all the major load bearing and transmitting rotary shafts are rigid and strong.

It is a further object of the present invention to provide such a transmission mechanism, in which all the major load bearing and transmitting rotary shafts are formed as solid shafts.

It is yet a further object of the present invention to provide such a transmission mechanism, which is light in weight.

It is yet a further object of the present invention to provide such a transmission mechanism, which is compact.

It is yet a further object of the present invention to provide such a transmission mechanism, which is cheap and easy to manufacture.

It is yet a further object of the present invention to provide such a transmission mechanism, which is easy and convenient to assemble and service.

According to the present invention, these and other objects are accomplished by a transmission mechanism for a vehicle, for receiving input of rotational power from a power supplying member which rotates in a particular rotational direction and for outputting rotational power to a power receiving member, comprising: (a) an input member which is rotatably mounted and which receives supply of said rotational power from said power supplying member; (b) a first driving gear wheel shaft; (c) a second driving gear wheel shaft mounted generally parallel to said first driving gear wheel shaft; (d) a driven gear wheel shaft mounted generally parallel to said first and second driving gear wheel shafts, said driven gear wheel shaft being rotationally connected to said power receiving member; (e) a driven gear wheel fixedly mounted on said driven gear wheel shaft; (f) a first driving gear wheel which is rotatably mounted on said first driving gear wheel shaft and is in constant mesh with said driven gear wheel; (g) a second driving gear wheel which is rotatably mounted on said second driving gear wheel shaft and is in constant mesh with said driven gear wheel; (h) a first synchromesh device which selectively engages said first driving gear wheel with said first driving gear wheel shaft; (i) a second synchromesh device which selectively engages said second driving gear wheel with said second driving gear wheel shaft; (j) a first clutching device, comprising a rotational power input member and a rotational power output member, mounted proximate to one end of said first driving gear wheel shaft closer to said input member with its rotational power output member rotationally coupled to said first driving gear wheel shaft and with its rotational power input member rotationally coupled to said input member, which according to selective control thereof is able selectively either not to couple said first driving gear wheel shaft to said input member in either relative rotational direction, or to couple said first driving gear wheel shaft to said input member in one relative rotational direction only, said one relative rotational direction being the one in which rotational power is required to be transmitted through said first clutching device in order to rotationally power said first driving gear wheel shaft from said power supplying member via said input member and said first clutching device when said power supplying member is being rotated in said particular rotational direction; and (k) a second clutching device, comprising a rotational power input member and a rotational power output member, mounted proximate to the one end of said second driving gear wheel shaft closer to said input member with its rotational power output member rotationally coupled to said second driving gear wheel shaft and with its rotational power input member rotationally coupled to said input member, which according to selective control thereof is able selectively either not to couple said second driving gear wheel shaft to said input member in either relative rotational direction, or to couple said second driving gear wheel shaft to said input member in one relative rotational direction only, said one relative rotational direction being the one in which rotational power is required to be transmitted through said second clutching device in order to rotationally power said second driving gear wheel shaft from said power supplying member via said input member and said second clutching device when said power supplying member is being rotated in said particular rotational direction.

According to such a structure, when shifting up from a lower speed stage provided by one of the first and the second driving gear wheels, for example by the first driving gear wheel, to a higher speed stage provided by the other of the first and the second driving gear wheels, for example by the second driving gear wheel, it is only necessary to engage the clutching device relating to the driving shaft of the driving gear wheel which provides the higher speed stage, i.e. in this example the second clutching device, without any need arising for simultaneously disengaging the clutching device which provides the lower speed stage, i.e. in this example the first clutching device; it is only necessary for this latter clutching device to be in its state in which it can free wheel. No difficulty will arise with relation to the transmission becoming locked up, because of the free wheeling capability of the clutching device relating to the lower speed stage, i.e. of the first clutching device. On the other hand, when shifting down from the higher speed stage to the lower speed stage, it is only necessary to disengage the clutching mechanism associated with the higher speed stage, i.e. in this example the second clutching device, and then the currently free wheeling clutching device associated with the lower speed stage, i.e. in this example the first clutching device, will automatically take up the transmission of power, if and when required. Further, since both of the clutching devices are mounted proximate to ends of their driving gear wheel shafts which are closer to the input member which is as a matter of course positioned very close to the power supply member or generally a crankshaft of the vehicle engine, both these clutching devices, which tend to be elements of large radial extent, are kept closer to the engine. This is very important and helpful with regard to providing desirable compactness and mountability of the transmission mechanism as a whole in a front engine rear wheel drive configuration type of vehicle, since it is possible to arrange this end of the transmission mechanism towards which the clutching devices are fitted to be the forward end thereof which is coupled to the internal combustion engine, and to arrange the other end of the transmission mechanism which is its axially very compact end to be its rear end which extends under the floor of the vehicle, and because of the small dimensions of this rear end no very troublsome humping of the floor is caused. Yet further, because the first and the second driving gear wheels are both meshed with the one driven gear wheel which is provided on the driven gear wheel shaft, therefore by this dual utilization of the driven gear wheel the transmission as a whole is kept low in its axial dimension, as well as light and compact; and by minimization of the number of components of the transmission the cost thereof and the difficulty of manufacture and assembly and servicing thereof are kept as low as practicable.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

Figure 1:
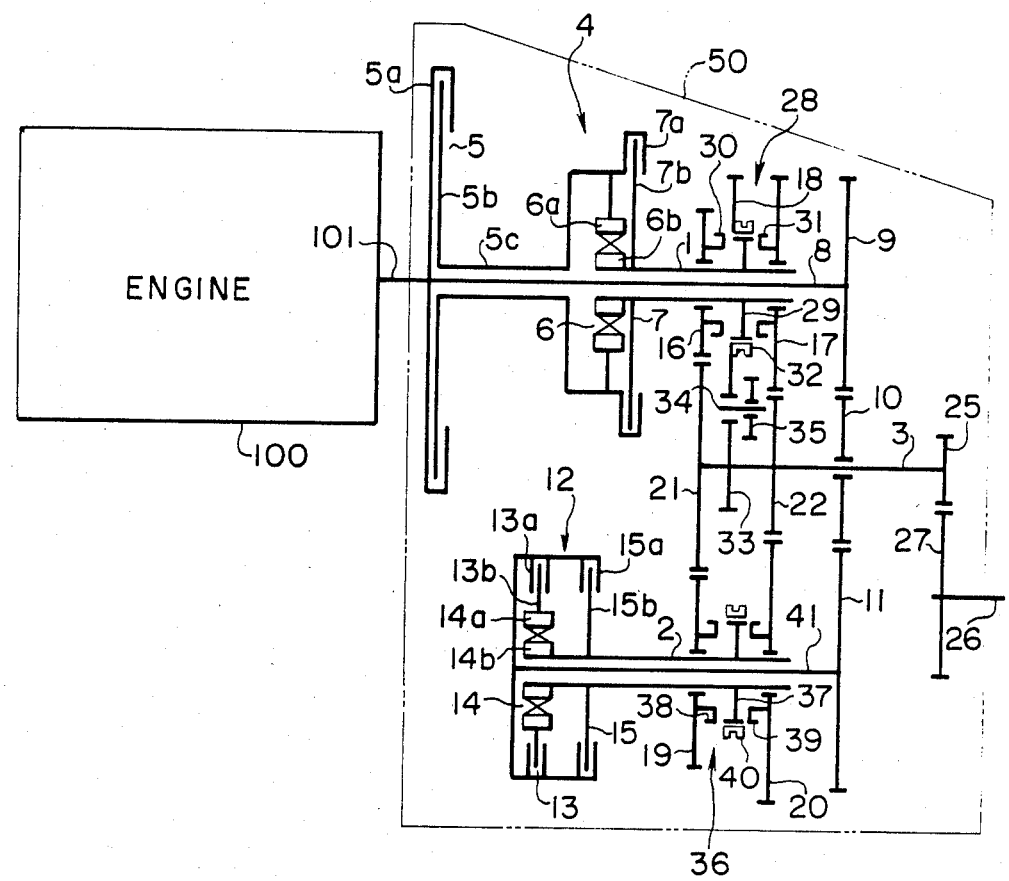
FIG. 1 is a schematic skeleton structural view of a transmission mechanism which is a first preferred embodiment of the transmission mechanism according to the present invention, also showing in schematic form an internal combustion engine associated therewith, this first preferred embodiment utilizing the flywheel of said internal combustion engine as one of the members of a clutching device thereof, incorporating a power transfer gear train which is located at a rather rearward axial position therealong.

The present invention will now be described with reference to the two preferred embodiments thereof, and with reference to the appended drawings. FIG. 1 is a schematic skeleton structural view of a transmission mechanism which is a first preferred embodiment of the transmission mechanism according to the present invention. In this figure, the reference numeral 100 denotes an automotive vehicle internal combustion engine which is shown as a block, and 101 denotes the crankshaft of this engine 100, which is rotated thereby in one rotational direction only, hereinafter termed the predetermined rotational direction, so as to transmit output rotational power from said internal combustion engine 100. This crankshaft 101 is directly drivingly coupled to a first intermediate shaft 8, which extends in a generally horizontal direction through the upper part of the transmission mechanism. In this connection, it should be understood that the transmission mechanism of FIG. 1, which though only schematically shown in the figure, and described in detail hereinunder, has an overall shape to be housed within a casing having a general shape as schematically shown by double dotted lines and designated by the reference numeral 50, which is particularly suitable for mounting to the rear end of the engine and below the dash panel in a front engine rear wheel drive automobile. This transmission is intended for mounting within a vehicle of the front longitudinally mounted engine rear wheel drive type configuration in the orientation shown in the figure, with the longitudinal axis of the vehicle extending in the left to right direction as seen in the figure, so that the left side of the illustrated view of the transmission mechanism relates to the front end of the transmission mechanism with respect to its mounting position in the vehicle and the right side of the illustrated view relates to its rear end and the upper and lower portions of the illustrated view relate to its top and bottom portions respectively; and these spatial expressions will be used freely in this specification hereinafter without further explanation.

A first driving gear wheel shaft 1 is hollow, and is coaxially rotatably mounted on the first intermediate shaft 8, thus also extending in a generally horizontal direction along the longitudinal axis of the vehicle, with a first power transfer gear wheel 9 being mounted on a rear end portion of the first intermediate shaft 8 which protrudes from the rear end of said first driving gear wheel shaft 1. This first driving gear wheel shaft 1 is selectively rotationally drivable from the crankshaft 101, via a first clutching assembly 4 as will be explained shortly. Parallel with the first driving gear wheel shaft 1 and the first intermediate shaft 8 and displaced somewhat in the downwards direction therefrom there is provided, in a vertically intermediate portion of the transmission mechanism, a generally horizontally and longitudinally extending driven gear wheel shaft 3. A second intermediate shaft 41, which extends in a generally horizontal direction through the lower part of the transmission mechanism, is mounted parallel with the driven gear wheel shaft 3 and the shafts 1 and 8 and somewhat displaced in the downwards direction from said driven gear wheel shaft 3. On this second intermediate shaft 41 there is coaxially rotatably mounted a hollow second driving gear wheel shaft 2. This second intermediate shaft 41 is driven from the crankshaft 101, via the first intermediate shaft 8, and via said first power transfer gear wheel 9 fixed to said first intermediate shaft 8, which is meshed with a second power transfer gear wheel 10 which is rotatably mounted on an axially intermediate portion of the driven gear wheel shaft 3, which is in turn meshed with a third power transfer gear wheel 11 which is fixedly mounted on said second intermediate shaft 41. The second driving gear wheel shaft 2 is selectively rotationally engagable to said second intermediate shaft 41 via a second clutching assembly 12, as will also be explained shortly. Thus, the second driving gear wheel shaft 2 is selectively rotationally engagable to the crankshaft 101, via the second clutching assembly 12.

In the shown first preferred embodiment of the present invention, according to a particular feature thereof, the third power transfer gear wheel 11 is larger in diameter than the first power transfer gear wheel 9, so that the gear train composed of the first, second, and third power transfer gear wheels 9, 10, and 11 is a speed reducing gear train; the reason for this is in consideration of various constructional considerations relating to the diameters of the various gear wheels for the various speed stages of the transmission, and will not be further described herein. Also, according to another corresponding particular feature of the first preferred embodiment, the distance between the first driving gear wheel shaft 1 and the driven gear wheel shaft 3 is less than the distance between the second driving gear wheel shaft 2 and said driven gear wheel shaft 3; this is again in consideration of various constructional considerations relating to the diameters of the various gear wheels for the various speed stages of the transmission, and will not be further described herein.

Between the crankshaft 101 and the first driving gear wheel shaft 1 there is provided a first clutching assembly 4 as located at the front side end of the first driving gear wheel shaft 1 closer to the crankshaft 101 of the engine 100. The function of this first clutching assembly 4 is that, according to selective control thereof exerted by a control system not shown in the drawing, between its rotational power input member and its rotational power output member, it can either: (a) provide freewheeling action in both rotational directions, not transmitting power in either rotational direction; or (b) provide direct transmission of rotational power in one rotational direction only, while it provides freewheeling action in the other rotational direction, said one rotational direction being the one which is required for power transmission to be performed through this first clutching assembly 4, to transmit rotational power from the crankshaft 101, i.e., said predetermined rotational direction; or (c) provide direct transmission of rotational power in both rotational directions. This first clutching assembly 4 can operate in any one of these three operational modes.

The details of the construction of this first clutching assembly 4 are as follows. A first clutch 5 is provided, comprising a power input member 5a which conveniently may be the flywheel of the internal combustion engine 100 and thus is directly rotationally connected to the crankshaft 101, and a power output member 5b rotationally connected to the left hand end of a hollow intermediate hollow shaft 5c (this shaft 5c may in fact simply be the hub portion of the power output member 5b) which is coaxially rotatably mounted on the first intermediate shaft 8, to the left hand (i.e. the front) end of the first driving gear wheel shaft 1. The rear end of the intermediate hollow shaft 5c is rotationally connected to a power input member 6a of a first one way clutch 6, the power output member 6b of which is rotationally connected to the front end of the first driving gear wheel shaft 1; and said right hand end of the intermediate hollow shaft 5c is also rotationally connected to a power input member 7a of a second clutch 7, the power output member 7b of which is rotationally connected to the front end of the first driving gear wheel shaft 1. Thus, the first clutch 5 is connected in series with the parallel combination of the first one way clutch 6 and the second clutch 7, and this series combination is connected between the engine crankshaft 101 and the first driving gear wheel shaft 1.

The more concrete construction of each of the first and second clutches 5 and 7 is per se well known. Each of them is engaged to transmit rotational power therethrough when an actuating hydraulic fluid pressure is supplied to its fluid actuator, and is disengaged to allow its two relatively rotatable members to rotate freely relative to one another when no such actuating hydraulic fluid pressure is supplied to its fluid actuator. Also, the more concrete structure of the first one way clutch 6 is per se well known. Its input and output members become engaged to transmit rotational power therebetween in one relative rotational direction when such relative rotation is attempted, but become disengaged from one another to allow for their free relative rotation in the other relative rotational direction when such relative rotation is attempted. Therefore, these constructions will not be further described herein.

Thus, the first clutching assembly 4 functions as follows. When the first clutch 5 and also the second clutch 7 are both engaged, the first clutching assembly 4 provides direct transmission of rotational power in both rotational directions. When the first clutch 5 is disengaged, irrespective of the engagement or disengagement condition of the second clutch 7, the first clutching assembly 4 provides freewheeling action in both rotational directions, not transmitting power in either rotational direction. When the first clutch 5 is engaged, but the second clutch 7 is disengaged, the first clutching assembly 4 provides direct transmission of rotational power in one rotational direction only, while it provides freewheeling action in the other rotational direction, said one rotational direction being the one which transmits power from the crankshaft 101 rotating in said predetermined rotational direction towards a power output shaft 26 which will be discussed later.

This particular type of clutching assembly, consisting essentially of the series combination of a clutch and the parallel combination of a clutch and a one way clutch, with the above described three mode type function, will hereinafter be termed a series—parallel clutching assembly.

Now, second clutching assembly 12 is provided between the second intermediate shaft 41 coupled to the third power transfer gear wheel 11 and the second driving gear wheel shaft 2 rotatably mounted on said second intermediate shaft 41, and as located at the front side end of the second driving gear wheel shaft 2 closer to the crankshaft 101 of the engine 100. The function of this second clutching assembly 12 is also exactly the same type of three mode type function as that of the first clutching assembly 4. The details of the construction of this second clutching assembly 12 are, however, different from the construction of the first clutching assembly 4, and are as follows. A third clutch 13 is provided, comprising a power input member 13a rotationally connected to the front end of the second intermediate shaft 41 and a power output member 13b rotationally connected to a power input member 14a of a second one way clutch 14, the power output member 14b of which is rotationally connected to the left hand or front end of the second driving gear wheel shaft 2. Thus, the third clutch 13 is connected in series with the second one way clutch 14, and this series combination is connected between the front end of the second intermediate shaft 41 and the second driving gear wheel shaft 2. Further, a fourth clutch 15 is provided, comprising a power input member 15a rotationally connected to the front end of the second intermediate shaft 41, and a power output member 15b rotationally connected to the front end of the second driving gear wheel shaft 2. The more concrete constructions of the third clutch 13 and of the fourth clutch 15 are per se well known. Further, the second one way clutch 14 is also per se well known. Thus these more concrete constructions will not be further described herein. The function of this second one way clutch 14, similarly to that of the first one way clutch 6, is that, when its power input member 14a is rotating in the aforesaid predetermined rotational direction, its power input member 14b is constrained to rotate in said predetermined rotational direction at least as quickly.

Thus, the second clutching assembly 12 functions as follows. When the fourth clutch 15 is engaged, the second clutching assembly 12 provides direct transmission of rotational power in both rotational directions. When the fourth clutch 15 is disengaged, then when the third clutch 13 is also disengaged the second clutching assembly 12 provides freewheeling action in both rotational directions, not transmitting power in either rotational direction. On the other hand, when the third clutch 13 is engaged, but the fourth clutch 15 is disengaged, the second clutching assembly 12 provides direct transmission of rotational power in one rotational direction only, while it provides freewheeling action in the other rotational direction, said one rotational direction being the one which transmits power from the crankshaft 101 rotating in said predetermined rotational direction towards the power output shaft 26, as will be seen hereinafter.

This particular type of clutching assembly, consisting essentially of the parallel combination of a clutch and the series combination of a clutch and a one way clutch, will hereinafter be termed a parallel—series clutching assembly.

On the driven gear wheel shaft 3 there are provided, in order from the left to the right in FIG. 1, a fixedly mounted a first/second speed driven gear wheel 21, a fixedly mounted reverse speed driven gear wheel 33, a fixedly mounted third/fourth speed driven gear wheel 22, the aforesaid rotatably mounted second or intermediate power transfer gear wheel 10, and a fixedly mounted power output gear wheel 25. On the first driving gear wheel shaft 1 there are rotatably mounted, in order from the left to the right in FIG. 1, a first speed driving gear wheel 16 and a third speed driving gear wheel 17. On the second driving gear wheel shaft 2 there are fixedly mounted, in order from the left to the right in FIG. 1, a second speed driving gear wheel 19 and a fourth speed driving gear wheel 20. The first speed driving gear wheel 16 is in constant mesh with the first/second speed driven gear wheel 21; the second speed driving gear wheel 19 is also in constant mesh with the first/second speed driven gear wheel 21 on its other side; the third speed driving gear wheel 17 is in constant mesh with the third speed driven gear wheel 23; and the fourth speed driving gear wheel 20 is also in constant mesh with the third/fourth speed driven gear wheel 22, on its other side.

Between the first speed driving gear wheel 16 and the third speed driving gear wheel 17 on the driving gear wheel shaft 1 there is fitted a first/third synchronizer 28, which performs the function of synchronizing engagement of the first speed stage and of the third speed stage, as will be understood hereinafter. This first/third synchronizer 28 is of a per se well known sort, in fact being an inertia lock type Borg Warner synchromesh device. The first/third synchronizer 28 comprises a hub 29 which is fixedly mounted on the driving gear wheel shaft 1, a set of first speed stage splines 30 provided integrally with the first speed driving gear wheel 16 and a set of third speed stage splines 31 provided integrally with the third speed driving gear wheel 17, and a first/third synchronizer sleeve 32 which is engaged by splines over the hub 29 so that it is rotationally coupled to the driving gear wheel shaft 1 but is free to slide axially thereon, which is engagable to either the first speed stage splines 30 or the third speed stage splines 31, respectively according as to whether it is slid to the left or the right on said hub 29. The function of this first/third synchronizer 28 is to rotationally couple either the first speed driving gear wheel 16 or the third speed driving gear wheel 17 or neither of them to the driving gear wheel shaft 1. On the ouside of the first/third synchronizer sleeve 32 there is formed a reverse speed driving gear wheel 18, the action of which will be explained later, which is substantially coplanar with the reverse speed driven gear wheel 33 fixedly mounted on the driven gear wheel shaft 3.

Between the second speed driving gear wheel 19 and the fourth speed driving gear wheel 20 on the second driving gear wheel shaft 2 there is fitted a second/fourth synchronizer 36, which performs the function of synchronizing engagement of the second stage and of the fourth speed stage, as will be understood hereinafter. This second/fourth synchronizer 36 is also of a per se well known sort, in fact also being an inertia lock type Borg Warner synchromesh device. The second-/fourth synchronizer 36 comprises a hub 37 which is fixedly mounted on the second driving gear wheel shaft 2, a set of second speed stage splines 38 provided integrally with the second speed driving gear wheel 19 and a set of fourth speed stage splines 39 provided integrally with the fourth speed driving gear wheel 20, and a second/fourth synchronizer sleeve 40 which is engaged by splines over the hub 37 so that it is rotationally coupled to the second driving gear wheel shaft 2 but is free to slide axially thereon, which is engagable to either the second speed stage splines 38 or the fourth speed stage splines 39, respectively according as to whether it is slid to the right or the left on said hub 37. The function of this second/fourth synchronizer 36 is to rotationally couple either the second speed driving gear wheel 19 or the fourth speed driving gear wheel 20 or neither of them to the second driving gear wheel shaft 2.

The previously mentioned power output gear wheel 25, provided as fixedly mounted on the driven gear wheel shaft 3, is in constant mesh with a gear wheel 27 fixed to the front end relative to the vehicle of a power output shaft 26, the rear end of which, not shown, projects out of the transmission casing 50 and is intended to be connected, when the transmission is fitted in a vehicle of the aforementioned front engine rear wheel drive configuration, to the front end of a propeller shaft which leads the output rotational power of the transmission via a per se well known differential device to the rear wheels of the vehicle; these arrangements are none of them shown in the figures.

Finally, on a reverse speed idler gear shaft 34 which is supported as parallel to the first and second driving gear wheel shafts 1 and 2 and to the driven gear wheel shaft 3 there is rotatably and slidably mounted a reverse speed idler gear wheel 35. Arrangments of a per se well known sort, not shown in the figures, are provided for shifting this reverse speed idler gear wheel 35 to and fro in the left and right directions on the reverse speed idler gear shaft 34; and, when the reverse speed idler gear wheel 35 is in its most rightward position on the reverse speed idler gear shaft 34, said reverse speed idler gear wheel 35 does not mesh with any other gear wheels and is therefore free to rotate; but, when the reverse speed idler gear wheel 35 is in its most leftward position on the reverse speed idler gear shaft 34, said reverse speed idler gear wheel 35 meshes with the reverse speed driving gear wheel 33 and with the reverse speed driven gear wheel 18 formed on the outside of the first/third synchronizer sleeve 32, so as to provide a reverse speed stage, as will be explained later.

Now the operation of the transmission mechanism shown in FIG. 1 will be explained. In this connection, it should be understood that selective engagement and disengagement of the first, second, third and fourth clutches 5, 7, 13, and 15, which may be performed according to selective supply or non supply of actuating hydraulic fluid pressure to pressure chambers thereof or in some other manner, according to circumstances, is suitably performed according to operational parameters of the vehicle comprising this transmission mechanism by a control system for the automatic transmission; and this control system will not be described herein with regard to its construction, because said control system does not directly form part of the present invention, and the functional explanation of its operation which will be given herein is sufficient for understanding of the principles of operation of the transmission mechanism according to the present invention. The movements leftwards and rightwards of the first/third synchronizer sleeve 32 of the first/third synchronizer 28, of the second/fourth synchronizer sleeve 40 of the second/fourth synchronizer 36, and of the reverse speed idler gear wheel 35 on the reverse speed idler gear shaft 34, are also suitably selectively performed (using appropriate forks or the like of a per se well known sort) by this control system, according to operational parameters of the vehicle of which this gear transmission mechanism forms part, and this operation of said control system will also be functionally explained hereinafter, but also will not be constructionally explained, because the gist of the present invention does not relate to the particular type of control system utilized for the automatic transmission. Various different control systems could be adapted to control this automatic transmission by one of ordinary skill in the transmission art, based upon the disclosure herein.

The engagement conditions of each of the first, second, third, and fourth clutches 5, 7, 13, and 15, the positions of the first/third synchronizer sleeve 32 of the first/third synchronizer 28 and of the second/fourth synchronizer sleeve 40 of the second/fourth synchronizer 36, the position of the reverse speed idler gear wheel 35 on the reverse speed idler gear shaft 34, and the engaged or over running conditions of the first and second one way clutches 6 and 14, will be explained, during the engagement of each of the speed stages which can be provided by the transmission mechanism according to the first preferred embodiment of the present invention explained above, i.e. during the engagement of the neutral speed stage, the first forward speed stage, the second forward speed stage, the third forward speed stage, the fourth forward speed stage, and the reverse speed stage; and also the sequences of shifting and of engagement and disengagement operations of these means which are employed in the various possible operations of shifting between these speed stages will be explained. This explanation will be made with reference to the Table, which is located at the end of this specification and before the claims appended thereto, and which is to be understood as incorporated into this specification at this point.

In the Table, there is shown, for each of the transmission speed stages that can be attained, the engagement conditions of the first, second, third and fourth clutches 5, 7, 13, and 15, the engagement or disengagement conditions of the first speed stage splines 30 and the third speed stage splines 31 to the first/third synchronizer sleeve 32 of the first/third synchronizer 28 and the engagement or disengagement conditions of the second speed stage splines 38 and the fourth speed stage splines 39 to the second/fourth synchronizer sleeve 40 of the second/fourth synchronizer 36, and the engaged or over running conditions of the first and second one way clutches 6 and 14, in this first preferred embodiment. In this Table, the symbol "E" indicates that the corresponding mechanism, i.e. the corresponding clutch or spline and sleeve mechanism, is engaged, and that this engagement is actually being used for transmission of rotational power; the symbol "D" indicates that the corresponding mechanism is disengaged; the symbol "e" indicates that the corresponding clutch or spline and sleeve mechanism is or may be engaged, but that this engagement is not acutally currently utilized, since transmission of rotational power by the transmission is in any case ensured by the engagement of some other device which is provided in parallel with said clutch or spline and sleeve mechanism; the symbol "B", when used with relation to the clutches 7 and 15 (only), indicates that the corresponding one of these clutches 7 and 15 is to be engaged when engine braking is required, as for example when the vehicle accelerator pedal is released; the symbol "A" indicates that the corresponding one way clutch is engaged, when the internal combustion engine 100 is urging the automotive vehicle along the road, i.e. in engine drive state; and the symbol "O" indicates that the corresponding one way clutch is disengaged, when the internal combustion engine 100 is urging the automotive vehicle along the road, i.e. in engine drive state.

NEUTRAL SPEED STAGE

In the neutral speed stage, which is schematically illustrated in FIG. 1, the clutches 5, 7, 13, and 15 are all disengaged. At this time the second/fourth synchronizer sleeve 40 of the second/fourth synchronizer 36 is set to its intermediate position by the control system, and the first/third synchronizer sleeve 32 of the first/third synchronizer 28 may also be set to its intermediate position by the control system, or as a preparatory step to engaging the first speed stage said first/third synchronizer sleeve 32 may be shifted to the left in FIG. 1 so as to engage with the splines 30 for first speed stage formed on the first speed driving gear wheel 16. Because the clutches 5, 7, 13, and 15 are none of them engaged, i.e. because the first and second clutching assemblies 4 and 12 are both in their completely disengaged states, neither one of the first and second driving gear wheel shafts 1 and 2 is being driven by the internal combustion engine 100, but on the contrary both of them are free; and accordingly no rotational force is supplied to the driven gear wheel shaft 3 or to the power output shaft 26. Thus the gear transmission mechanism according to the first preferred embodiment of the present invention functions in its neutral speed stage.

SHIFTING FROM NEUTRAL TO THE FIRST SPEED STAGE

In order to shift from the neutral speed stage into the first speed stage and to start the vehicle off from rest, first, as a preparatory action as mentioned above, the first/third synchronizer sleeve 32 of the first/third synchronizer 28 is moved to its leftwardly displaced position by the above mentioned transmission control system, so as rotationally to couple the first speed driving gear wheel 16 with the driven gear wheel shaft 3. No drive is yet transmitted at this time, because the first clutch 5 is still disengaged. Next, the first clutch 5 is smoothly engaged, while keeping the second clutch 7, the third clutch 13, and the fourth clutch 15 still disengaged. At this time, rotational power is transmitted from the crankshaft 101 through the first clutch 5 and the first one way clutch 6 to the first driving gear wheel shaft 1; but no rotational power is transmitted to the second driving gear wheel shaft 2, because the third clutch 13 remains disengaged, and because also the fourth clutch 15 remains disengaged. From the first driving gear wheel shaft 1, this rotational power is transmitted via the sleeve 32 of the first/third synchronizer 28 and the splines 30 engaged thereto the first speed driving gear wheel 16 and thence to the first/second speed driven gear wheel 21 in constant mesh therewith which transmits said rotation to the driven gear wheel shaft 3, which rotates the power output gear wheel 25, thus transmitting output rotational power via the gear wheel 27 to the power output shaft 26. Thus the vehicle is driven away from rest and operates in the first speed stage.

If, during running in the first speed stage, engine braking is currently required, for example when the accelerator pedal of the vehicle is released, then the second clutch 7 is engaged, while otherwise it is disengaged. If the second clutch 7 is engaged in engine overrunning condition, so as to bypass the action of the first one way clutch 6, rotational power can be transmitted in the reverse direction to one described above via this second clutch 7 from the power output shaft 26 to the crankshaft 101 in order to provide engine braking, and otherwise during engine overrunning condition the first one way clutch 6 runs free or overruns, thus not providing any engine braking and allowing the vehicle to free wheel or coast.

During steady running in the first speed stage the second/fourth synchronizer sleeve 40 of the second/fourth synchronizer 36 is set to its intermediate position by said control system, so that neither the second speed driving gear wheel 19 nor the fourth speed driving gear wheel 20 is rotationally connected to the second driving gear wheel shaft 2; however, as a preparatory action to engaging the second speed stage, in fact the second/fourth synchronizer sleeve 40 may be set to its leftwardly displaced position in FIG. 1 by the above mentioned transmission control system, so as rotationally to couple the second speed driving gear wheel 19 with the second driving gear wheel shaft 2. This will cause no particular operational problem, because at this time the third clutch 13 and the fourth clutch 15 are still disengaged.

Thus the gear transmission mechanism according to the first preferred embodiment of the present invention function in its first speed stage. By the way, the shifting from the first speed stage to the neutral speed stage is accomplished simply by disengaging the first clutch 5 (and the second clutch 7 if it is engaged), and by returning the sleeve 32 of the first/third synchronizer 28 and the sleeve 40 of the second/fourth synchronizer 36 to their intermediate or disengaged positions, if either of them is not there yet.

UPSHIFTING FROM FIRST SPEED STAGE TO SECOND SPEED STAGE

In order to shift up from the first speed stage into the stage speed stage, first, as a preparatory action as mentioned above, the second/fourth synchronizer sleeve 40 of the second/fourth synchronizer 36 is moved to its leftwardly displaced position by the transmission control system, so as rotationally to couple the second speed driving gear wheel 19 with the second driving gear wheel shaft 2. No drive is yet transmitted at this time, because the third clutch 13 (and of course the fourth clutch 15 also) is still disengaged. Further, also as a preparatory action, the second clutch 7 is disengaged, if in fact it was previously engaged. Next, in order to actually perform the upshift, which of course will be during an engine drive condition and not during an engine overrunning condition, the third clutch 13 is smoothly engaged, while keeping the second clutch 7 still disengaged. As will be shortly explained, it is not necessary yet at this time to disengage the first clutch 5, and hence no particular complicated mutual control of the first clutch 5 and the third clutch 13 is required for the upshifting from the first speed stage to the second speed stage; this is a particular good feature of the present invention.

As the third clutch 13 becomes engaged, rotational power starts to be transmitted from the crankshaft 101 via the first intermediate shaft 8 and the first, second, and third power transfer gear wheels 9, 10, and 11 and via the second intermediate shaft 41 to the second clutching assembly 12, whence it passes through the now engaged third clutch 13 and the second one way clutch 14 to the second driving gear wheel shaft 2. From the second driving gear wheel shaft 2, this rotational power is transmitted via the sleeve 40 of the second/fourth synchronizer 36 and the splines 38 engaged thereto to the second speed driving gear wheel 19 and thence to the first/second speed driven gear wheel 21 in constant mesh therewith, which transmits said rotation to the driven gear wheel shaft 3, which rotates the power output gear wheel 25, thus transmitting output rotational power to the power output shaft 26; and at this time automatically the first one way clutch 6 starts to run free or overrun, since as will be easily understood by one of ordinary skill in the transmission art based upon the foregoing explanation the rotational speed (in the predetermined rotational direction) of its power input member 6a now becomes less relative to the rotational speed of its power output member 6b. Accordingly no question of locking up of the transmission can occur, provided that the second clutch 7 which bypasses this first one way clutch 6 is definitely disengaged before the third clutch 13 starts to be engaged to start the upshifting. Thus the vehicle comes to operate in the second speed stage. At a convenient time, during steady running in the second speed stage, the first/third synchronizer sleeve 32 of the first/third synchronizer 28 may be returned to its intermediate position, so as to stop the first one way clutch 6 free wheeling and so as to preserve the life of said first one way clutch 6; and also the first clutch 5 is disengaged; but this returning of the sleeve 32 and disengaging of the first clutch 5 are not actually urgent.

If, during running in the second speed stage, engine braking is currently required, for example when the accelerator pedal of the vehicle is released, then the fourth clutch 15 is engaged, while otherwise it is disengaged. If the fourth clutch 15 is engaged in engine overrunning condition, so as to bypass the action of the second one way clutch 14 and of the third clutch 13, rotational power can be transmitted in the reverse direction to the one described above via this fourth clutch 15 from the power output shaft 26 to the crankshaft 101 in order to provide engine braking, and otherwise during engine overrunning condition the second one way clutch 14 runs free or overruns, thus not providing any engine braking and allowing the vehicle to free wheel or coast.

Further, during steady running in the second speed stage the synchronizer sleeve 32 of the first/third synchronizer 28 is set to its intermediate position by said control system, so that neither the first speed driving gear wheel 16 nor the third speed driving gear wheel 17 is rotationally connected to the first driving gear wheel shaft 1; however, as a preparatory action to engaging the first speed stage or the third speed stage in fact the first/third synchronizer sleeve 32 may be set respectively to its leftwardly or its rightwardly displaced position by the above mentioned transmission control system, so as rotationally to couple, respectively, either the first speed driving gear wheel 16 or the third speed driving gear wheel 17 to the first driving gear wheel shaft 1. Neither of these actions will cause any particular operational problem, because at this time the first clutch 5 is still disengaged; and in the case of a downshift to first speed stage in any case the first one way clutch 6 could operate to run free, even if the first clutch 5 were engaged.

DOWNSHIFT FROM SECOND SPEED STAGE TO FIRST SPEED STAGE

During steady running in the second speed stage the first/third synchronizer sleeve 32 of the first/third synchronizer 28 is kept at its intermediate position by said control system, so that neither the first speed driving gear wheel 16 nor the third speed driving gear wheel 17 is rotationally connected to the first driving gear wheel shaft 1; however, as a preparatory action to engaging the first speed stage when downshifting thereto from the second speed stage, the sleeve 32 of the first/third synchronizer 28 is set to its leftwardly displaced position by the transmission control system, so as rotationally to couple the first speed driving gear wheel 16 with the first driving gear wheel shaft 1. This will cause no particular operational problem, because at this time the first clutch 5 is still disengaged. Next, also as a preparatory action, with of course the second clutch 7 disengaged, the first clutch 5 is engaged. As before, as explained above, this will cause the first one way clutch 6 to run free or overrun.

Next, in order to actually perform the downshift, which may either be during engine drive condition in the case of a kick down type downshift or may be in engine overrunning condition in the case of an engine braking desirable type downshift, simply the third clutch 13 is smoothly disengaged, the fourth clutch 15 previously having been disengaged if it was engaged, while keeping the second clutch 7 still disengaged. Since at this time the first clutch 5 is already engaged, hence no particular complicated mutual control of the first clutch 5 and the third clutch 13 is required for the downshifting from the second speed stage to the first speed stage; this is another particular good feature of the present invention.

As the third clutch 13 becomes disengaged, if this is a case of a kick down type downshift, then the rotational speed of the internal combustion engine 100 will quickly increase to a rotational speed at which the first one way clutch 6 will stop running free, so that now rotational power starts to be transmitted from the crankshaft 101 through the first clutch 5 and the first one way clutch 6 to the first driving gear wheel shaft 1, and thence via the sleeve 32 of the first/third synchronizer 28 and the splines 30 engaged thereto to the first speed driving gear wheel 16, which transmits said rotation to the first/second speed driven gear wheel 21 engaged therewith, which transmits said rotation to the driven gear wheel shaft 3, which rotates the power output gear wheel 25, thus transmitting output rotational power to the power output shaft 26, now at a gearing ratio appropriate to the first speed stage.

On the other hand, as the third clutch 13 becomes disengaged, if this is not a case of a kick down type downshift, but is a case of a power off type downshift, then at this time automatically the first one way clutch 6 continues to run free or overrun, and the vehicle is allowed to free wheel or coast. Now, if engine braking is required after the downshift to the first speed stage, which typically will be the case in the case of a power off type downshift, then the bypass clutch 7 which bypasses the first one way clutch 6 is smoothly engaged, and accordingly the coasting or free running operational condition of the vehicle is quickly transformed into an engine braking condition. The ability to provide engine braking in the first speed stage is a consequence of the provision of the bypass clutch 7, i.e. is a consequence of the capabiltiy of the first clutching assembly 4 to be locked up in both rotational directions.

Thus the vehicle comes to operate in the first speed stage. At a convenient time, during steady running in the first speed stage, the synchronizer sleeve 40 of the second/fourth synchronizer 36 may be returned to its intermediate position, so as to stop the third clutch 13 from slipping and so as to preserve the life of said third clutch 13.

UPSHIFTING FROM SECOND SPEED STAGE TO THIRD SPEED STAGE

In order to shift up from the second speed stage into the third speed stage, first, as a preparatory action as mentioned above, the synchronizer sleeve 32 of the first/third synchronizer 28 is moved to its rightwardly displaced position by the transmission control system, so as rotationally to couple the third speed driving gear wheel 17 with the first driving gear wheel shaft 1. No drive is yet transmitted at this time, because the first clutch 5 is still disengaged. Next, in order to actually perform the upshift, which of course will be during engine drive condition and not during an engine overrunning condition, the first clutch 5 is smoothly engaged, while keeping the third clutch 13 still engaged, and after of course disengaging the fourth clutch 15 if it was engaged previously. It is not necessary yet at this time to disengage the third clutch 13, and hence no particular complicated mutual control of the first clutch 5 and the third clutch 13 is required for the upshifting; this is another particular good feature of the present invention. As the first clutch 5 becomes engaged, rotational power starts to be transmitted from the crankshaft 101 through the first clutch 5 and the first one way clutch 6 to the first driving gear wheel shaft 1. From the first driving gear wheel shaft 1, this rotational power is transmitted via the sleeve 32 of the first/third synchronizer 28 and the splines 31 engaged thereto to the third speed driving gear wheel 17 and thence to the third/fourth speed driven gear wheel 22 engaged therewith, which transmits said rotation to the driven gear wheel shaft 3, which rotates the power output gear wheel 25, thus transmitting output rotational power to the power output shaft 26, now at a rotational speed appropriate to the third speed stage; and at this time automatically the second one way clutch 14 starts to run free or overrun, since as will be easily understood by one of ordinary skill in the transmission art based upon the foregoing explanation the rotational speed in its operational direction to provide transmission of rotary power of its power input member 14a now becomes less relative to the rotational speed of its power output member 14b. Accordingly no question of locking up of the transmission can occur. Thus the vehicle comes to operate in the third speed stage. At a convenient time, during steady running in the third speed stage, the synchronizer sleeve 40 of the second/fourth synchronizer 36 may be returned to the intermediate position, so as to stop the second one way clutch 14 from free wheeling and so as to preserve the life of said second one way clutch 14; and also the third clutch 13 is disengaged.

During steady running in the third speed stage the synchronizer sleeve 40 of the second/fourth synchronizer 36 is set to its intermediate position by said control system, so that neither the second speed driving gear wheel 19 nor the fourth speed driving gear wheel 20 is rotationally connected to the second driving gear wheel shaft 2; however, as a preparatory action to engaging the second speed stage or the fourth speed stage, respectively, in fact the second/fourth synchronizer sleeve 40 may be set to its leftwardly or its rightwardly displaced position in FIG. 1 by the above mentioned transmission control system, so as rotationally to couple, respectively, either the second speed driving gear wheel 19 or the fourth speed driving gear wheel 20 to the second driving gear wheel shaft 2. Neither of these actions will cause any particular operational problem, because at this time the third clutch 13 (and of course the fourth clutch 15) is still disengaged; and in the case of a downshift to second speed stage in any case the second one way clutch 14 could operate to run free, even if the third clutch 13 were engaged, provided that the fourth clutch 15 were disengaged.

If, during running in the third speed stage, engine braking is currently required, for example when the accelerator pedal of the vehicle is released, then the second clutch 7 is engaged, while otherwise it is disengaged. If the second clutch 7 is engaged in engine overrunning condition, so as to bypass the action of the first one way clutch 6, rotational power can be transmitted in the reverse direction to the one described above via this second clutch 7 from the power output shaft 26 to the crankshaft 101 of the internal combustion engine 100 in order to provide engine braking, and otherwise during engine overrunning condition the first one way clutch 6 runs free or overruns, thus not providing any engine braking and allowing the vehicle to free wheel or coast, in this third speed stage like in the first speed stage.

DOWNSHIFTING FROM THIRD SPEED STAGE TO SECOND SPEED STAGE

During steady running in the third speed stage the synchronizer sleeve 40 of the second/fourth synchronizer 36 is kept at its intermediate position by said control system, so that neither the second speed driving gear wheel 19 nor the fourth speed driving gear wheel 20 is rotationally connected to the second driving gear wheel shaft 2; however, as a preparatory action to engaging the second speed stage when downshifting thereto from the third speed stage, the second/fourth synchronizer 36 is set to its leftwardly displaced position as seen in FIG. 1 by the transmission control system, so as rotationally to couple the second speed driving gear wheel 19 to the second driving gear wheel shaft 2. This will cause no particular operational problem, because at this time the third clutch 13 is still disengaged, and of course so is the fourth clutch 15. Next, also as a preparatory action, the third clutch 13 is engaged. As before, as explained above, this will cause the second one way clutch 14 to run free or overrun.

Next, in order to actually perform the downshift, which may either be during engine drive condition in the case of a kick down type downshift or may be in engine overrunning condition in the case of a reducing road speed type downshift, simply the first clutch 5 is smoothly disengaged. Since at this time the third clutch 13 is already engaged, hence no particular complicated mutual control of the first clutch 5 and the third clutch 13 is required for the downshifting from the third speed stage to the second speed stage; this is another particular good feature of the present invention.

As the first clutch 5 becomes disengaged, if this is a case of a kick down type downshift, then the rotational speed of the internal combustion engine 100 will quickly increase to a rotational speed at which the second one way clutch 14 will stop running free, so that now rotational power starts to be transmitted from the crankshaft 101 via the first intermediate shaft 8 and the first, second, and third power transfer gear wheels 9, 10, and 11 and via the second intermediate shaft 41 and through the third clutch 13 and the second one way clutch 14 to the second driving gear wheel shaft 2, and thence via the sleeve 40 of the second/fourth synchronizer 36 and the splines 38 engaged thereto to the second speed driving gear wheel 19 and thence to the first/second speed driven gear wheel 21 engaged therewith which transmits said rotation to the driven gear wheel shaft 3, which rotates the power output gear wheel 25, thus transmitting output rotational power to the power output shaft 26, now at a gearing ratio appropriate to the second speed stage.

On the other hand, as the first clutch 5 becomes disengaged, if this is not a case of a kick down type downshift, but is a case of a power off type downshift, then at this time automatically the second one way clutch 14 continues to run free or overrun, and the vehicle is allowed to free wheel or coast. As explained above, engine braking may be available, in this first preferred embodiment, in the second speed stage, buy subsequently engaging the fourth clutch 15.

Thus the vehicle comes to operate in the second speed stage. At a convenient time, during steady running in the second speed stage, the synchronizer sleeve 32 of the first/third synchronizer 28 may be returned to its intermediate position, so as to stop the first clutch 5 from slipping and so as to preserve the life of said first clutch 5.

UPSHIFTING FROM THE THIRD SPEED STAGE TO FOURTH SPEED STAGE

In order to shift up from the third speed stage into the fourth speed stage, first, as a preparatory action as mentioned above, the second/fourth synchronizer sleeve 40 of the second/fourth synchronizer 36 is moved to its rightwardly displaced position by the transmission control system, so as rotationally to couple the fourth speed driving gear wheel 20 with the second driving gear wheel shaft 2. No drive is yet transmitted at this time, because the third clutch 13 (and of course the fourth clutch 15) is still disengaged. Further, also as a preparatory action, the second clutch 7 is disengaged, if in fact it was previously engaged. Next, in order to actually perform the upshift, which of course will be during engine drive condition and not during an engine overrunning condition, the third clutch 13 is smoothly engaged, while keeping the second clutch 7 still disengaged. As will be shortly explained, it is not necessary yet at this time to disengage the first clutch 5, and hence no particular complicated mutual control of the first clutch 5 and the third clutch 13 is required for the upshifting; this is yet another particular good feature of the present invention. As the third clutch 13 becomes engaged, rotational power starts to be transmitted from the crankshaft 101 of the engine 100 via the first intermediate shaft 8 and the first, second, and third power transfer gear wheels 9, 10, and 11 and via the second intermediate shaft 41 and through the third clutch 13 and the second one way clutch 14 to the second driving gear wheel shaft 2. From the second driving gear wheel shaft 2, this rotational power is transmitted via the sleeve 40 of the second/fourth synchronizer 36 and the splines 39 engaged thereto to the fourth speed driving gear wheel 20 and thence to the third/fourth speed driven gear wheel 22 engaged therewith which transmits said rotation to the driven gear wheel shaft 3, which rotates the power output gear wheel 25, thus transmitting output rotational power to the power output shaft 26, now at a gearing ratio appropriate to the fourth speed stage; and at this time automatically the first one way clutch 6 starts to run free of overrun, since as will be easily understood by one of ordinary skill in the transmission art based upon the foregoing explanation the rotational speed (in the predetermined rotational direction) of its power input member 6a now becomes less relative to the rotational speed of its power output member 6b. Accordingly no question of locking up of the transmission can occur, provided that the second clutch 7 is definitely disengaged before the third clutch 13 starts to be engaged to start the upshifting. Thus the vehicle comes to operate in the fourth speed stage. At a convenient time, during steady running in the fourth speed stage, the first/third synchronizer sleeve 32 of the first/third synchronizer 28 may be returned to the intermediate position, so as to stop the first one way clutch 6 from free wheeling and so as to preserve the life of said first one way clutch 6; and also the first clutch 5 is disengaged.

If, during running in the fourth speed stage, engine braking is currently required, for example when the accelerator pedal of the vehicle is released, then the fourth clutch 15 is engaged, while otherwise it is disengaged. If the fourth clutch 15 is engaged in engine overrunning condition, so as to bypass the action of the second one way clutch 14, rotational power can be transmitted in the reverse direction to the one described above via this fourth clutch 15 from the power output shaft 26 to the crankshaft 101 of the internal combustion engine 100 in order to provide engine braking, and otherwise during engine overrunning condition the second one way clutch 14 runs free or overruns, thus not providing any engine braking and allowing the vehicle to free wheel or coast.

Further, during steady running in the fourth speed stage the synchronizer sleeve 32 of the first/third synchronizer 28 is set to its intermediate position by said control system, so that neither the first speed driving gear wheel 16 nor the third speed driving gear wheel 16 is rotationally connected to the first driving gear wheel shaft 1; however, as a preparatory action to engaging the third speed stage, in fact the first/third synchronizer sleeve 32 may be set to its rightwardly displaced position in FIG. 1 by the above mentioned transmission control system, so as rotationally to couple the third speed driving gear wheel 16 to the first driving gear wheel shaft 1. This action will not cause any particular operational problem, because at this time the first clutch 5 is still disengaged; and in any case the first one way clutch 6 could operate to run free, even if the first clutch 5 were engaged.

DOWNSHIFTING FROM FOURTH SPEED STAGE TO THIRD SPEED STAGE

During steady running in the fourth speed stage the first/third synchronizer sleeve 32 of the first/third synchronizer 28 is kept at its intermediate position by said control system, so that the third speed driving gear wheel 16 is not rotationally connected to the first driving gear wheel shaft 1; however, as mentioned above as a preparatory action to engaging the third speed stage when downshifting thereto from the fourth speed stage, the first/third synchronizer 28 is set to its rightwardly displaced position by the transmission control system, so as rotationally to couple the third speed driving gear wheel 16 to the first driving gear wheel shaft 1. This will cause no particular operational problem, because at this time the first clutch 5 is still disengaged. Next, also as a preparatory action, with of course the second clutch 7 disengaged, the first clutch 5 is engaged. As before, as explained above, this will cause the first one way clutch 6 to run free or overrun.

Next, in order to actually perform the downshift, which may either be during engine drive condition in the case of a kick down type downshift or may be in engine overrunning condition in the case of an engine braking desirable type downshift, simply the third clutch 13 is smoothly disengaged with of course the fourth clutch 15 disengaged, while keeping the second clutch 7 still disengaged. Since at this time the first clutch 5 is already engaged, hence no particular complicated mutual control of the first clutch 5 and the third clutch 13 is required for the downshifting; this is yet another particular good feature of the present invention.

As the third clutch 13 becomes disengaged, if this is a case of a kick down type downshift, then the rotational speed of the internal combustion engine 100 will quickly increase to a rotational speed at which the first one way clutch 6 will stop running free, so that now rotational power starts to be transmitted from the crankshaft 101 through the first clutch 5 and the first one way clutch 6 to the first driving gear wheel shaft 1, and thence via the sleeve 32 of the first/third synchronizer 28 and the splines 31 engaged thereto to the third speed driving gear wheel 17 and thence to the third/fourth speed driven gear wheel 22 engaged therewith which transmits said rotation to the driven gear wheel shaft 3, which rotates the power output gear wheel 25, thus transmitting output rotational power to the power output shaft 26, now at a gearing ratio appropriate to the third speed stage.

On the other hand, as the third clutch 13 becomes disengaged, if this is not a case of a kick down type downshift, but is a case of a power off type downshift, then at this time automatically the first one way clutch 6 continues to run free or overrun, and the vehicle is allowed to free wheel or coast. Now, if engine braking is required after the downshift to the third speed stage, which typically will be the case in the case of a power off type downshift, then the bypass clutch 7 which bypasses the first one way clutch 6 is smoothly engaged, and accordingly the coasting or free running operational condition of the vehicle is quickly transformed into an engine braking condition. The ability to provide engine braking in the third speed stage is again a consequence of the provision of the bypass clutch 7, i.e. is a consequence of the capability of the first clutching assembly 4 to be locked up in both rotational directions.

Thus the vehicle comes to operate in the third speed stage. At a convenient time, during steady running in the third speed stage, the synchronizer sleeve 40 of the second/fourth synchronizer 36 may be returned to its intermediate position, so as to stop the second one way clutch 14 free wheeling and so as to preserve the life of said second one way clutch 14.

REVERSE SPEED STAGE

In the reverse speed stage, the first/third synchronizer sleeve 32 of the first/third synchronizer 28 is set to its intermediate position by the above mentioned transmission control system, the second/fourth synchronizer sleeve 40 of the second/fourth synchronizer 36 is set to its intermediate position by said control system, and then the reverse speed idler gear wheel 35 is shifted in the leftwards direction along the reverse speed idler gear shaft 34 by the abovementioned control system via a fork or the like of a per se well known sort, so that said reverse speed idler gear wheel 35 engages both with the reverse speed driving gear wheel 18 formed on the outside of the first/third synchronizer sleeve 32 and also with the reverse speed driven gear wheel 33 fixed on the driven gear wheel shaft 3. Further, the first clutch 5 and the second clutch 7 are engaged, while the third clutch 13 and the fourth clutch 15 are disengaged. Thus, the rotation of the crankshaft 101 is transmitted via the first clutch 5 and the second clutch 7 to the first driving gear wheel shaft 1, and thence is transmitted via the reverse speed driving gear wheel 18 and the reverse speed idler gear wheel 35 and the reverse speed driven gear wheel 33 to the driven gear wheel shaft 3, thus rotating this driven gear wheel shaft 3 and the power output gear wheel 25 mounted thereon in the reverse rotational sense to that rotational sense in which said members were rotated in all the other speed stages whose operation has been explained above, since one more gear wheel, the reverse speed idler gear wheel 35, is involved in the rotational force transmission path. Thus reverse rotational driving power is transmitted to the power output shaft 26. Thus the gear transmission mechanism according to the first preferred embodiment of the present invention functions in its reverse speed stage. The second clutch 7 is kept engaged at all times during this reverse speed stage operation, because engine braking is very important at this time, and in order to prolong the operational life of the first one way clutch 6 by preventing it from performing overrunning action at this time and in order to relieve it of load.

SUMMARY OF THE FIRST PREFERRED EMBODIMENT

According to this functioning of the first preferred embodiment, described above, during the engagement of any one of the speed stages, it is possible to prepare for the engagement of the next speed stage required, in other words to make preliminary preparations for the engagement of the next higher or the next lower speed stage. This is possible because alternate speed stages are provided by different ones of the two power transmission systems provided between the crankshaft 101 and the driven gear wheel shaft 3, and thus the power transmission system relating to the next speed stage can be prepared for the subsequent engagement of that next speed stage by shifting of the synchronizer sleeve relating thereto while still the current speed stage is being provided; and after this preparation the actual shifting between speed stages can be performed by altering the engagement conditions of the first and second clutching assemblies 4 and 12. Further, because of the provision of the first and second one way clutches 6 and 14, i.e. because these first and second clutching assemblies 4 and 12 have the function of providing one way transmission of rotational power in a certain one of their operational modes, it is not necessary to operate the first and second clutching assemblies 4 and 12 together in any closely or subtly related fashion, and accordingly timing problems with regard to simultaneous or subtly synchronized operation of these first and second clutching assemblies 4 and 12 do not arise. Thus, both in the case of an upshift and in the case of a power on downshift or a so called kick down type downshift, this change between speed stages is accomplished smartly and positively, as is desirable. Further, because of the provision of the operational mode, for both the first and second clutching assemblies 4 and 12, of transmission of rotational power in both rotational directions, i.e. because of the provision of the second clutch 7 which bypasses the first one way clutch 6 and of the fourth clutch 15 which bypasses the second one way clutch 14, thereby, in the case of a power off downshift or an engine braking required type downshift, engine braking is made available in those speed stages of the transmission mechanism which are provided by the power transmission systems associated with those first and second clutching assemblies 4 and 12, i.e. in all of the first through the fourth speed stages of the transmission mechanism.

In the connection, with regard to the matter of engine braking in the non shifting operation of the transmission, if as is often the case the engine braking effect is required to be available in vehicle operation in all of the first through the fourth forward speed stages, then the method of operation of the second clutch 7 and the fourth clutch 15 (which respectively provide bypass action for the first one way clutch 6 and the second one way clutch 14) may be summarized as follows: the one of these bypass clutches which is incorporated in the one of the first and second clutching assemblies 4 and 12 which is currently being utilized for the transmission of rotary power in the current forward speed stage—i.e. the second clutch 7 in the case of the first speed stage and the third speed stage and the fourth clutch 15 in the case of the second speed stage and the fourth speed stage—is kept engaged, and the other one of said bypass clutches is kept disengaged. On the other hand, as a preparatory action to shifting between speed stages, either upshifting or downshifting, said one of the second and fourth or bypass clutches 7 and 15 which was thus engaged is first disengaged; and after the shift of speed stages the other one of said bypass clutches is engaged in its turn.

With regard to the detail constructional merits of this first preferred embodiment of the present invention, because the first and second clutching assemblies 4 and 12 are provided at the same end of the transmission, i.e. at its front end proximate to the internal combustion engine 100 (the left in FIG. 1), thereby these elements, which as explained above are necessarily of fairly large radius compared with the radiuses of the gear wheels of the transmission, are kept towards the internal combustion engine 100 at the front of the transmission casing 50 and away from the rear portion of the transmission casing 50. Now, in the case of a front engined rear wheel drive vehicle, where the rear end of the transmission is typically mounted under the bulkhead separating the engine room from the passenger compartment thereof, typically there is considerable space available at the front end of the transmission where it is attached to the engine, but very little space available at the rear end of the transmission where it is attached to the propeller shaft. In such a construction, therefore, it is particularly beneficial for the various clutching elements, which as explained above are the elements of particularly large diameter, to be concentrated together at the front end of the transmission, as in the shown first preferred embodiment of the present invention; this is extremely helpful for fitting the transmission in place without causing any undesirably large hump in the transmission tunnel formed along the floor of the vehicle, and without any such constraint occurring as that the entire transmission should be forced to be mounted forward of the bulkhead, for example. Accordingly, this transmission has particularly good mountability, because it has been possible to configure its transmission casing 50 as schematically indicated in FIG. 1, with its upper rear portion substantially lower than its upper front portion. Thereby the interference between this upper rear transmission casing portion and the bulkhead of the vehicle is greatly reduced, making for a much less intrusive transmission hump on the inside front part of the floor of the vehicle, and in the best case allowing for such a transmission hump to be completely eliminated.

A further particular advantage of this first preferred embodiment is that, because the power transfer gear wheel train comprising the first, second, and third power transfer gear wheels 9, 10, and 11 which transfers rotational power between the crankshaft 101 and the second clutching assembly 12 is located at an intermediate position along the axes of the first and second driving gear wheel shafts 1 and 2 and the driven gear wheel shaft 3, thereby it is possible to utilize the flywheel 5a of the internal combustion engine 100 as a power input member for the first clutch 5. Since this first clutch 5 is the one which is utilized in starting the vehicle off from rest, both in the forward and in the backward direction, it is the one of the first through the fourth clutches 5, 7, 13, and 15 which is required to transmit the most torque, and accordingly is the one which is required to be of the greatest radius; and thus this dual form of construction is particularly advantageous for providing good compactness. It is true that this axially intermediate positioning of the power transfer gear train does slightly increase the height of the rear upper portion of the transmission casing 50; but this effect, although undesirable, is relatively slight.

Another particular very important advantage of the shown construction is that the first/second speed driven gear wheel 21 is utilized as a driven gear wheel for both the first speed stage and also for the second speed stage, by being simultaneously constantly meshed with both the first speed driving gear wheel 16 and also the second speed driving gear wheel 19; and also similarly the third/fourth speed driven gear wheel 22 is utilized as a driven gear wheel for both the third speed stage and also for the fourth speed stage, by being simultaneously constantly meshed with both the third speed driving gear wheel 19 and also the fourth speed driving gear wheel 20. This means that the axial or longitudinal dimension of the transmission casing 50 can be minimized, and also that the upper rear portion of the transmission casing 50 can further be kept low; and this further contributes to vehicle mountability of the transmission. The dual utilization for the first/second speed driven gear wheel 21 and the third/fourth speed driven gear wheel 22 is also very helpful for minimizing transmission weight and improving general compactness of the transmission mechanism.

THE SECOND PREFERRED EMBODIMENT

Figure 2:
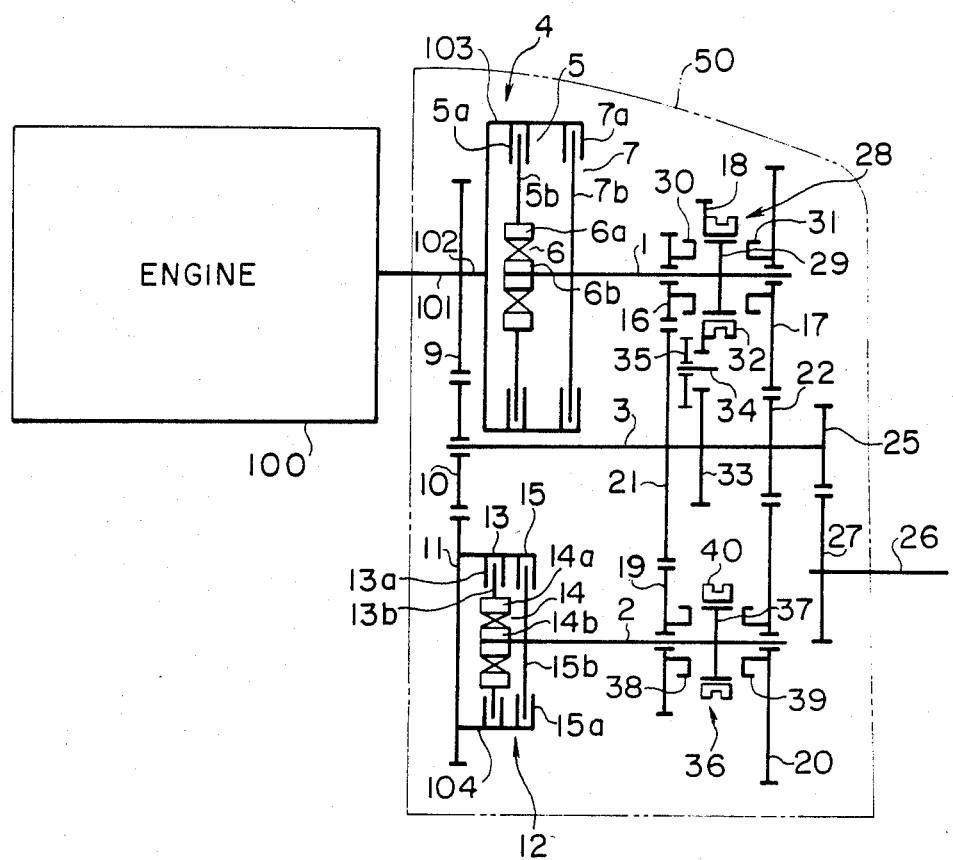
FIG. 2 is a schematic skeleton structural view, similar to FIG. 1, showing a second preferred embodiment which provides essentially the same function as the first preferred embodiment via a different construction in which said power transfer gear train is provided at the front of the transmission.

FIG. 2 is a schematic skeleton structural view of a transmission mechanism which is a second preferred embodiment of the transmission mechanism according to the present invention. In this figure, parts of the second preferred embodiment shown, which correspond to parts of the first preferred embodiment shown in FIG. 1, and which have the same functions, are designated by the same reference numerals and symbols as in that figure.

In this second preferred embodiment, the differences from the first preferred embodiment are as follows.

First, the power transfer gear train incorporating the first, second, and third power transfer gear wheels 9, 10, and 11 is not provided, as it was in the first preferred embodiment, towards the rear ends of the first and second driving gear wheel shafts 1 and 2 and at an intermediate axial position along the driven gear wheel shaft 3; instead, this gear train is provided at the front end of the transmission, with the first power transfer gear wheel 9 directly mounted to the end of the engine crankshaft 101, and with a short shaft 102 joining said first power transfer gear wheel 9 to a casing 103 of the first clutching assembly 4 to which the power input member 5a of the first clutch 5 is connected. In accordance with this modified construction, the first driving gear wheel shaft 1 is formed as a solid shaft, and no intermediate shaft such as the first intermediate shaft 8 of the first preferred embodiment is provided. The second power transfer gear wheel 10 is thus rotatably mounted on the extreme front end of the driven gear wheel shaft 3, and the third power transfer gear wheel 11 is correspondingly likewise rotatably mounted on the extreme front end of the second driving gear wheel shaft 2, said third power transfer gear wheel 11 being directly joined to a casing 104 of the second clutching assembly 12 to which the power input member 13a of the third clutch 13 is connected. In accordance with this modified construction, the second driving gear wheel shaft 2 is also formed as a solid shaft, and no intermediate shaft such as the second intermediate shaft 41 of the first preferred embodiment is provided. Although by this construction of the second preferred embodiment the first and second clutching assemblies 4 and 12 are displaced slightly towards the rear end of the transmission casing 50 as compared with their positions in the construction of the first preferred embodiment, this is not such a very great constructional disadvantage.

Next, the construction of the second clutching assembly 12 is exactly the same as in the case of the first preferred embodiment as shown in FIG. 1; but in line with the above described modification the first clutching assembly 4, rather than being a series-parallel type of clutching assembly as it was in the first preferred embodiment, is structured substantially exactly the same as the second clutching assembly 12, and is likewise a parallel-series type clutching assembly. Thus, in this second preferred embodiment, the first clutching assembly 4 provides the same function as in the first preferred embodiment, but via a different construction and in a different way; and also this first clutching assembly 4 does not incorporate the flywheel of the internal combustion engine 100, thus not providing the dual function therefor which was available in the case of the first preferred embodiment. However, the method of operation, in terms of their three operational modes of two way power transmission, one way power transmission, and two way free wheeling, of the first and second clutching assemblies 4 and 12, in order to provide the various speed stages of the transmission, is the same as in the first preferred embodiment, as is the overall method of operation of the transmission mechanism. Accordingly, in this second preferred embodiment, the same benefical effects with regard to ease of timing control of the first and second clutching assemblies 4 and 12 are available, as in the first preferred embodiment. Further, engine braking is also available in all the forward speed stages, by the selective operation of the first clutching assembly 4 and the second clutching assembly 12 to be locked up in both rotational directions. The functioning of this second preferred embodiment will not be described in detail. In fact, based upon the discussions and explanations above, it will be clear to one of ordinary skill in the transmission art that there is no functional difference between the functioning of this second embodiment and the functioning of the first preferred embodiment shown in FIG. 1. In order to shift the transmission mechanism shown in FIG. 2 to its various speed stages, the engagement conditions of the various clutches and synchronizers and one way clutches shown in the appended Table will apply, with suitable modifications thereto being made in the light of the fact that the first clutching assembly 4 is a parallel-series type of three operational mode clutching assembly in this second embodiment, rather than being a series-parallel type of three operational mode clutching assembly as in the case of the first preferred embodiment; these necessary modifications will easily be made by one of ordinary skill in the transmission art, based upon the above disclosure.

The same constructional advantages with regard to lowness of the upper rear portion of the transmission casing 50 are obtained, in this second preferred embodiment, as in the first preferred embodiment shown in FIG. 1. A further particular important constructional advantage of this second preferred embodiment is that, since all of the first and second driving gear wheel shafts 1 and 2 and the driven gear wheel shaft 3 are solid shafts, and none of them are formed as a tubular shaft, thereby the strength and rigidity of support of these shafts is advantageously enhanced, and their cheapness and ease of manufacture and assembly and servicing are improved. Also, by the elimination of the first and second intermediate shafts 8 and 41, the simplicity and weight as a whole of this second preferred embodiment is improved in comparison with the first preferred embodiment.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

TABLE

| ASSEMBLY | | SPEED STAGE | | | | |
|---|---|---|---|---|---|---|
| | | 1 | 2 | 3 | 4 | R |
| 4 | CLUTCH 5 | E | D/e | E | D/e | E |
| | ONE WAY CLUTCH 6 | A | O | A | O | A |
| | CLUTCH 7 | B | D | B | D | B |
| 12 | CLUTCH 13 | D/e | E | D/e | E | D/e |
| | ONE WAY CLUTCH 14 | O | A | O | A | O |
| | CLUTCH 15 | D | B | D | B | D |
| 28 | SPLINES 30 | E | D/e | D | D | D |
| | SPLINES 31 | D | D/e | E | D/e | D |
| 36 | SPLINES 38 | D/e | E | D/e | D | D |
| | SPLINES 39 | D | D | D/e | E | D |

What is claimed is:

1. A transmission mechanism for a vehicle, for receiving input of rotational power from a power supplying member which rotates in a particular rotational direction and for outputting rotational power to a power receiving member, comprising:

an input member connected to said power supply member and which is rotatably mounted and receives supplying of said rotational power from said power supply member;

a first driving gear wheel shaft;

a second driving gear wheel shaft mounted generally parallel to said first driving gear wheel shaft;

a driven gear wheel shaft mounted generally parallel to said first and second driving gear wheel shafts, said driven gear wheel shaft being rotationally connected to said power receiving member;

a first driven gear wheel fixedly mounted on said driven gear wheel shaft;

a first driving gear wheel which is rotatably mounted on said first driving gear wheel shaft and is in constant mesh with said driven gear wheel, said first driving and driven gear wheels providing a first reduction gear ratio from said first driving gear wheel shaft to said driven gear wheel shaft;

a second driven gear wheel fixedly mounted on said driven gear wheel shaft;

a second driving gear wheel which is rotatably mounted on said second driving gear wheel shaft and is in constant mesh with said first driven gear wheel, said second driving and said first driven gear wheels providing a second reduction gear ratio smaller than said first reduction gear ratio from said second driving gear wheel shaft to said driven gear wheel shaft;

a third driving gear wheel which is rotatably mounted on said first driving gear wheel shaft and is in constant mesh with said second driven gear wheel, said third driving and said second driven gear wheels providing a third reduction gear ratio smaller than said second reduction gear ratio from said first driving gear wheel shaft to said driven gear wheel shaft;

a fourth driving gear wheel which is rotatably mounted on said second driving gear wheel shaft and is in constant mesh with said second driven gear wheel, said fourth driving and said second driven gear wheel providing a fourth reduction gear ratio smaller than said third reduction gear ratio from said second driving gear wheel shaft to said driven gear shaft;

a first synchromesh device which engages said first driving gear wheel with said first driving gear wheel shaft when said first synchromesh device is shifted to one side of a neutral position thereof and which engages said third driving gear wheel with said first driving gear wheel shaft when said first synchromesh device is shifted to the other side of said neutral position thereof opposite to said one side;

a second synchromesh device which engages said second driving gear wheel with said second driving gear wheel shaft when said second synchromesh device is shifted to one side of a neutral position thereof and which engages said fourth driving gear wheel with said second driving gear wheel shaft when said second synchromesh device is shifted to the other side of said neutral position thereof opposite of said one side;

a first clutching device comprising a rotational power input member and a rotational power output member, mounted proximate to one end of said first driving gear wheel shaft with its rotational power output member rotationally coupled to said first driving gear wheel shaft, which according to selective control thereof is able to selectively couple said first driving gear wheel shaft to said input member in either relative rotational direction, and couple said first driving gear wheel shaft to said input member in a first relative rotational direction only, said first relative rotational direction being a direction in which rotational power is required to be transmitted through said first clutching device in order to rotationally power said first driving gear wheel shaft from said power supplying member via said input member and said first clutching device when said power supplying member is being rotated in said particular rotational direction; and a second clutching device comprising a rotational power input member and a rotational power output member, mounted proximate to the one end of said second driving gear wheel shaft with its rotational power output member rotationally coupled to said second driving gear wheel shaft, which according to selective control thereof is able to selectively couple said second driving gear wheel shaft to said input member in either relative rotational direction, and couple said second driving gear wheel shaft to said input member in a second relative rotational direction only, said second relative rotational direction being a direction in which rotational power is required to be transmitted through said second clutching device in order to rotationally power said second driving gear wheel shaft from said power supplying member via said input member and said second clutching device when said power supplying member is being rotated in said particular rotational direction wherein one of said rotational power input members of said first and second clutching devices is coaxially rotationally coupled to said input member; and rotational power transfer means including a first power transfer gear wheel coaxially rotationally coupled to said one of said rotational power input members of said first and second clutching devices, a second power transfer gear wheel coaxially rotationally coupled to the other of said rotational power input members of said first and second clutching devices, and an intermediate power transfer gear wheel rotatably mounted on said driven gear wheel shaft and meshed with said first and second power transfer gear wheels.

2. A transmission mechanism according to claim 1, wherein said intermediate power transfer gear wheel rotatably mounted on said driven gear wheel shaft is located closer to its one end which is closer to said first through fourth driving gear wheels than to said first and second clutching devices.

3. A transmission mechanism according to claim 1, wherein said intermediate power transfer gear wheel rotatably mounted on said driven gear wheel shaft is located closer to its end which is closer to said first and second clutching devices than to said first through fourth driving gear wheels.

4. A transmission mechanism according to claim 1, further comprising a first intermediate shaft and a second intermediate shaft, said first driving gear wheel shaft being hollow and being rotatably mounted on said first intermediate shaft and said second driving gear wheel shaft being hollow and being rotatably mounted on said second intermediate shaft, wherein said driving power transfer gear wheel is coupled to said input member via said first intermediate shaft on which it is fixedly mounted and said driven power transfer gear wheel is coupled to said rotational power input member of said second clutching device via said second intermediate shaft on which it is fixedly mounted, and wherein said intermediate power transfer gear wheel is located on said driven gear wheel shaft further from its end which is in the same longitudinal direction as said one end of each of said first and second driving gear wheel shafts than said driven gear wheel.

5. A transmission mechanism according to claim 1, wherein said first clutching device also according to selective control thereof is able to couple said first driving gear wheel shaft to said input member in both rotational directions.

6. A transmission mechanism according to claim 1, wherein said second clutching device also according to selective control thereof is able to couple said second driving gear wheel shaft to said input member in both rotational directions.

* * * * *